Figure 1:
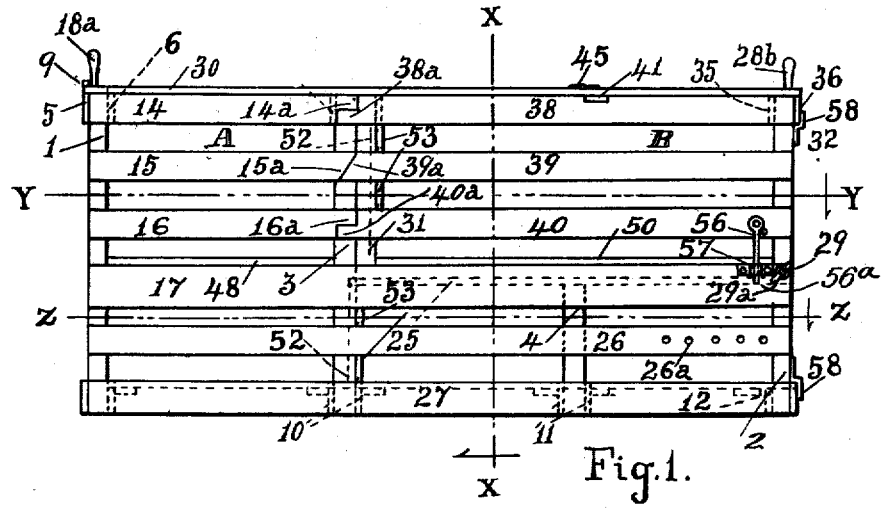

G. W. REED, Jr.
HOG AND POULTRY CRATE.
APPLICATION FILED JUNE 5, 1909.

1,012,157.

Patented Dec. 19, 1911.
4 SHEETS—SHEET 2.

Witnesses.
Kathryn Nelson
John A. Boyd

Inventor.
George W. Reed Jr.
By Atty N. DuBois

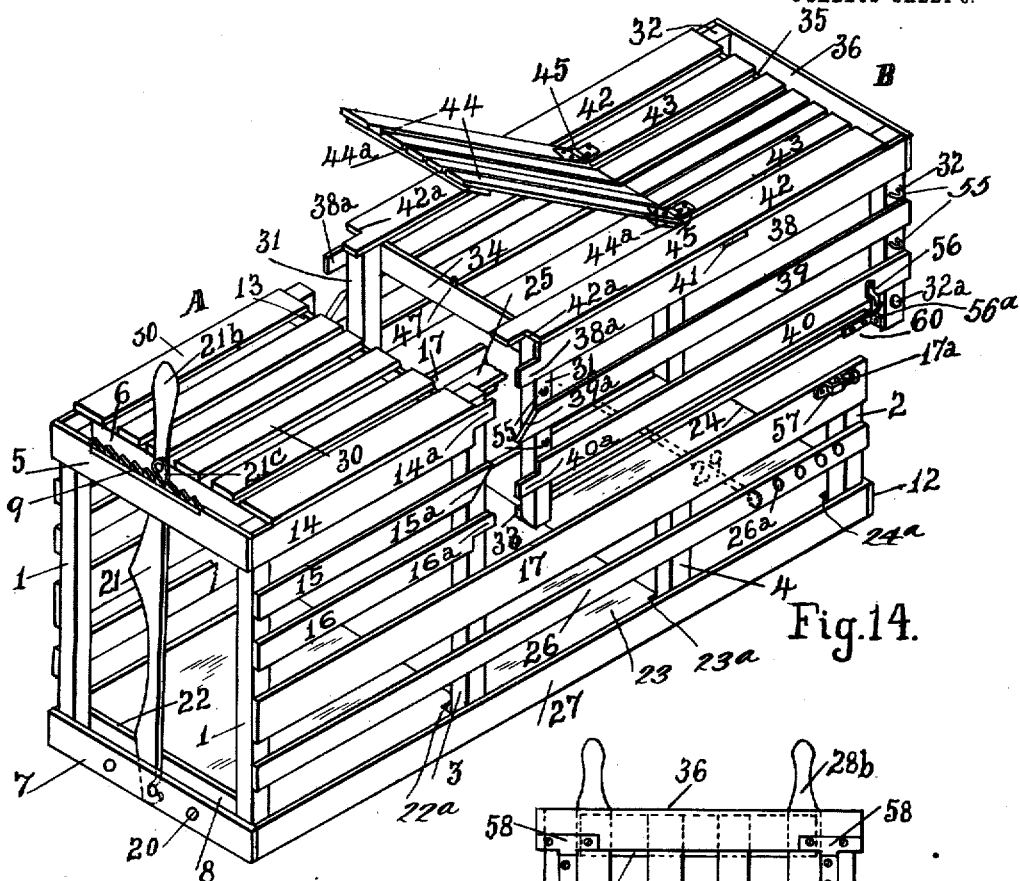

G. W. REED, Jr.
HOG AND POULTRY CRATE.
APPLICATION FILED JUNE 5, 1909.
1,012,157.
Patented Dec. 19, 1911.
4 SHEETS—SHEET 4.
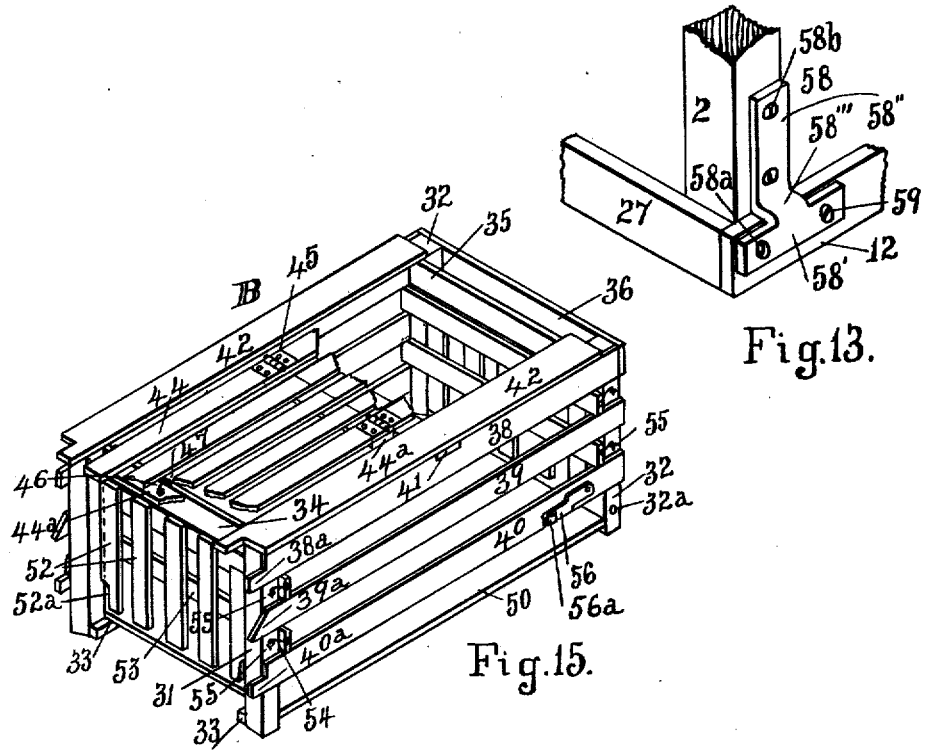
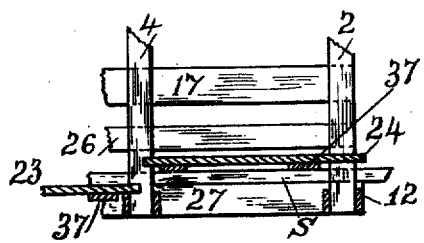
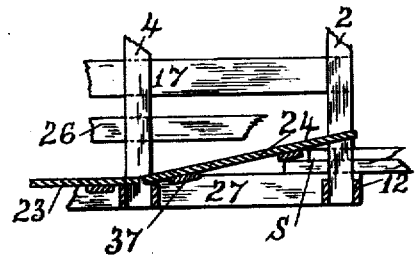
Witnesses.
Kathryn Nelson.
John A. Boyer
Inventor.
George W. Reed Jr
By Atty N. DuBois.

UNITED STATES PATENT OFFICE.

GEORGE W. REED, JR., OF TOPEKA, KANSAS.

HOG AND POULTRY CRATE.

1,012,157.  Specification of Letters Patent.  Patented Dec. 19, 1911.

Application filed June 5, 1909. Serial No. 500,392.

*To all whom it may concern:*

Be it known that I, GEORGE W. REED, Jr., a citizen of the United States, residing at Topeka, in the county of Shawnee and State of Kansas, have invented a new and useful Hog and Poultry Crate, of which the following is such a full, clear, and exact description as will enable others skilled in the art to make and use my said invention.

This invention relates to sectional crates serviceable for containing live stock, hogs, poultry, etc., for transportation; also serviceable for holding animals for breeding purposes, or for marking, or ringing or for treatment or for surgical operations.

The purposes of this invention are to provide a sectional hog and poultry crate comprising a main section and a supplemental detachable section so constructed and arranged that when the sections are connected the side slats of the sections will be in line and will interlock with each other in position to support a removable sectional deck or floor on one level, extending the full length of the crate and adapted to be placed in different positions in the crate. To provide in connection with the detachable section a door affording access to the upper part of the crate without opening the lower part of the crate; and a floor and end gates making the detachable section a complete coop in itself. To provide means for connecting the detachable section with the main section so that when the rear gate which serves for both sections, is in place and fastened the detachable section will be held against vertical movement, transverse movement, or lengthwise movement. To provide in connection with the main section a hog-catching and hog-holding lever and an automatic latch acting to hold said lever in place when the animal is caught. To provide a sectional movable main floor adapted to be tilted, or raised, or removed entirely as circumstances may require. To provide a rear gate of improved construction, and improved means for securing said gate on the crate. To provide in connection with the detachable section of the crate, top slats fitting around the upwardly extending ends of the posts of the main section and serving to prevent lateral movement of the supplemental section. To provide automatically acting locks for locking the supplemental section in place on the main section. To provide means for bracing and giving stability to the corner posts at the rear end of the main section and the corner posts at the rear end of the detachable section to prevent spreading. To provide adjustable means to prevent the animal in the crate from moving rearward. To provide interchangeable gates for dividing the upper part of the crate, or the lower part of the crate, into compartments, and also adapted to serve as end gates for the detachable section when it is used as a separate coop and to provide other new and useful features of construction hereinafter set forth.

With these ends in view my invention consists in the novel features of construction and combinations of parts shown in the annexed drawings, to which reference is hereby made, and hereinafter particularly described, and finally recited in the claims.

Figure 2:
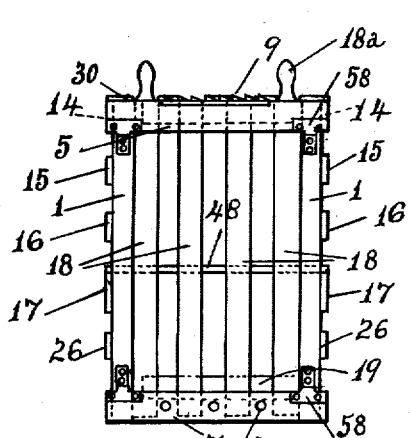
Figure 3:
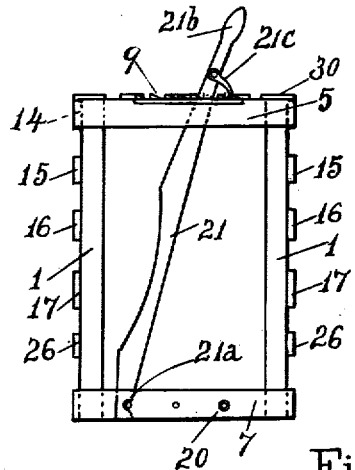
Figure 4:
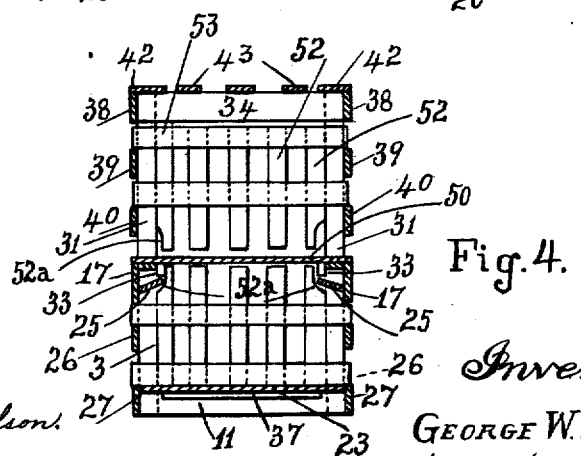
Figure 5:
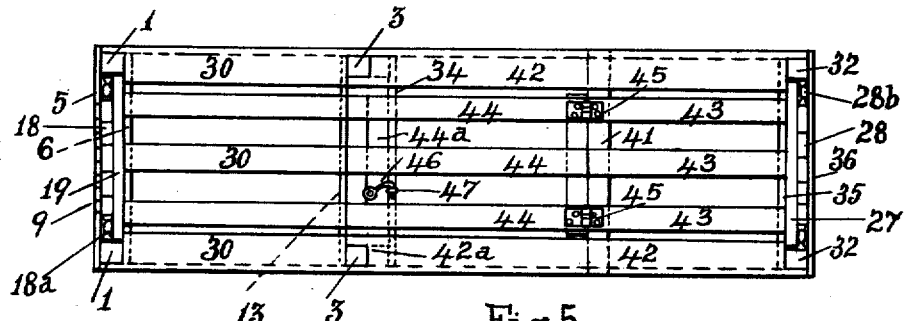
Figure 6:
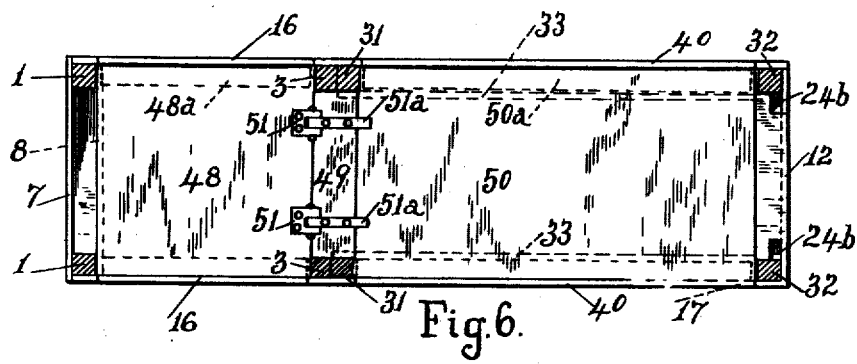
Figure 7:
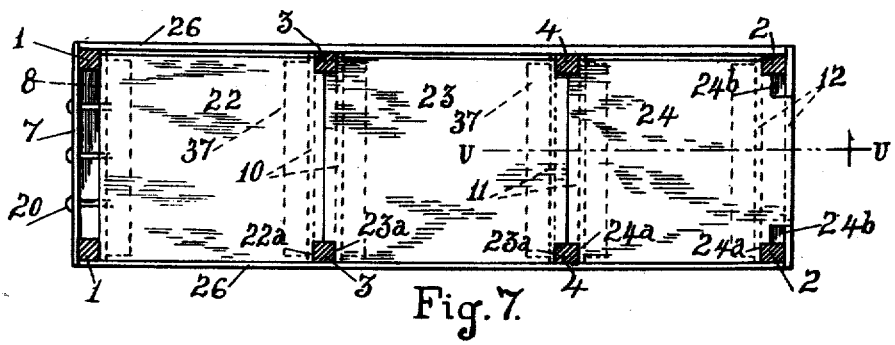

In the drawings Figure 1 is a side elevation of the complete apparatus; Fig. 2 is a left-hand end elevation showing the front gate in position; Fig. 3 is a left-hand end elevation showing the hog-holding lever in position; Fig. 4 is a vertical transverse section on the line X. X. of Fig. 1; Fig. 5 is a top plan of the complete crate; Fig. 6 is a horizontal lengthwise section on the line Y. Y. of Fig. 1. In this view the end gates and partition gates are omitted. Fig. 7 is a horizontal lengthwise section on the line Z. Z. of Fig. 1, the gates being omitted; Fig. 8 is an enlarged elevation of the right-hand end of the crate, and shows the rear gate in position thereon; Fig. 9 is a partial horizontal section on the line V. V. of Fig. 8; Fig. 10 is an enlarged partial vertical section on the line W. W. of Fig. 8; Fig. 11 is a vertical section on the line U. U. of Fig. 7 and shows one section of the floor tilted; Fig. 12 is a similar section showing one section of the floor raised vertically; Fig. 13 is an isometric view showing in detail one of the corner braces; Fig. 14 is an isometric view showing the detachable section in proximity to the main section, in the position which it will occupy immediately before the sections are connected; and Fig. 15 is an isometric view of the detachable section of the crate arranged for use as a separate coop, in this view the top slats are shown as broken away to expose the parts below the slats.

Similar reference numerals, letters and characters designate like parts in the different views.

The crate comprises a main section A, and a supplemental or detachable section B. I will first describe the section A and then the section B.

The section A has two relatively long vertical corner posts 1; two relatively short corner posts 2; two relatively long intermediate posts 3 and two relatively short intermediate posts 4. Cross pieces 5 and 6 connect the upper ends of the posts 1. Similar cross-pieces 7 and 8 connect the lower ends of the posts 1. A ratchet-bar 9 is fixed on the cross-piece 5. Two parallel cross-pieces 10 connect the lower ends of the posts 3; two parallel cross-pieces 11 connect the lower ends of the posts 4 and two parallel cross-pieces 12 connect the lower ends of the posts 2. A single cross-piece 13 connects the upper ends of the posts 3. Parallel horizontal slats 14, 15 and 16 are fixed on the posts 1 and 3. The slats 14 and 16 have at one end tenons $14^a$ and $16^a$ respectively, and the slat 15 has an inclined end $15^a$. Horizontal slats 17, 26 and 27 are secured on the posts 1, 3, 4 and 2. The slats 26 have a series of transverse holes $26^a$ adapted to receive the bolt 29. The bolt 29 may be placed in different opposite holes $26^a$ to locate it to suit the length of the animal in the crate so that the bolt will prevent backward movement of the animal. The bolt 29 also fits in the holes $17^a$ of the slats 17. When the supplemental section is in place on the main section and the crate is closed and the rear gate is in place, the bolt 29 serves to secure the parts together as shown in Fig. 8. When the rear gate is removed the bolt 29 may be placed in the holes $26^a$ so that the bolt will extend across the crate and prevent backing of the animal contained in the crate; and the bolt may be placed in different holes to suit animals of different lengths. The position of the bolt 29 in one set of holes $26^a$ is indicated by dotted lines in Fig. 14. Top slats 30 are secured on the upper cross-pieces 6 and 13.

The lower or main floor (Fig. 7) consists of a front section 22, resting on the cross-pieces 8 and 10; a middle section 23 resting on the cross-pieces 10 and 11, and a rear section 24 resting on the cross-pieces 11 and 12. The floor section 22 has notches $22^a$ fitting around the posts 3. The section 23 has notches $23^a$ fitting around the posts 3 and the posts 4. The section 24 has notches $24^a$ fitting around the posts 2 and 4 and notches $24^b$ accommodating the downwardly extending ends of the outer slats 28 of the rear gate. The floor sections 22, 23 and 24 are somewhat narrower than the crate in order that they may be readily placed in or removed from the crate and each of the sections has on its under side two transverse battens 27 to which the floor boards are nailed.

It will be observed that the rear end of the section 24 extends over and rests upon the outer cross-piece 12 and the front edge of the section 22 rests against the posts 1. This construction admits of inserting the front gate between the posts 1 so that when the gate is in place the lower cross-piece 19 of the gate will rest on the bolts 20; and also admits of inserting the rear gate between the posts 2 so that the lower cross-piece $27^x$ of the gate will rest upon the floor and the lower parts of the two outer gate-slats 28 will extend downward through the notches $24^b$ and will prevent the lower end of the gate from being pushed rearward.

The front gate comprises vertical slats 18 nailed on cross pieces 19. The outside slats 18 have handles $18^a$ for handling the gate. The rear gate comprises vertical slats 28 nailed on battens $27^x$. The slats 28 have handles $28^b$ for handling the gate. Blocks $28^a$ fixed on the slats 28 have transverse holes in line with the holes $17^a$ and $32^a$, accommodating the bolt 29 which connects together the main section, the complemental section and the gate. The lower ends of the outer slats 28 extend downward through the notches $24^b$ and prevent forward or rearward movement of the lower part of the gate.

The detachable section B, has vertical front posts 31 and vertical rear posts 32. A cross-piece 34 connects the upper ends of the posts 31. Cross pieces 35 and 36 connect the upper ends of the posts 32. Holes $32^a$ extend through the posts 32 and accommodate the bolt 29 which passes through the registering holes $17^a$ and $32^a$ and connects together the two sections of the crate as clearly shown in Figs. 1, 8 and 9. When the section B is in place on the section A the inclined lower ends of the posts 31 and 32 rest upon the upper surface of the inclined foot boards 25. The foot-boards 25 are inclined outwardly in order that the front feet of the hog resting on the foot-boards may slip outwardly and stop against the side rails 17, and also to prevent the hog's feet from slipping inwardly and getting off the foot board. It is obvious that if during the operation of breeding, the feet of the hog supported on the foot boards should slip inwardly and off of the foot boards great injury might result. Parallel horizontal slats 38, 39 and 40 are fixed on the posts 31 and 32. The slats 38 have tenons $38^a$ matching the tenons $14^a$ of the slats 14. The slats 39 have inclined ends $39^a$ matching the inclined ends $15^a$ of the slats 15 and the slats 40 have tenons $40^a$ matching the tenons $46^a$ of the slats 16. The interlocking slats 14 and 38; 15 and 39; and 16 and 40 serve as continuous supports for a deck or decks extending the entire length of the crate, on one level; they also serve to prevent vertical or lateral displacement of section B when it is connected with section A. Horizontal rails 33 connect the lower ends of the posts 31 and 32 and support the floor of the section B when the section is detached and in use as a separate poultry coop. Angle irons 60 connect the rear ends of the rails 33 with the posts 32 so that the ends of the rails will not interfere with the movement of the rear gate. A cross piece 41 is fixed on the side rails 38. The long top slats 42 are secured on the cross pieces 34, 41 and 35 and the shorter slats 43 are secured on the cross-pieces 41 and 35. The slats 42 have notches 42$^a$ fitting around the upper ends of the posts 3, and the ends of the slats strike against the posts to prevent sidewise movement of the complemental crate section.

The section B has a top door consisting of slats 44 nailed on battens 44$^a$. Hinges 45 connect the door with the slats 43. When the door is closed the rear batten 44$^a$ lies against the cross piece 41 and the front batten 44$^a$ lies against the cross piece 34. A hook 46 mounted on the cross-piece 44$^a$ hooks into a staple 47 on the cross-piece 34 to secure the door when it is closed.

A horizontal intermediate removable floor or deck within the crate comprises a front section 48, an intermediate section 49 and a rear section 50, all on the same level and supported on the side slats of the crate. In the drawings I have shown the deck supported on the slats 17, but it obviously may be supported on the side slats above or below the slats 17; and one or more decks may be used at pleasure. The floor boards of the section 48 are nailed on battens 48$^a$ fitting loosely between the posts 1 and 3, and the ends of the floor boards project across the side rail 17 as shown in Figs. 1 and 3. The floor boards of the section 50 are nailed on battens 50$^a$ fitting loosely between the posts 31 and 32, and the battens being parallel to and between the side slats of the crate prevent transverse movement of the deck sections. The front end of the section 48 is adjacent to the posts 1 and the rear end of the section 50 is adjacent to the posts 32. The width of the section 49 is slightly greater than the combined widths of the posts 3 and 31, and its length is slightly less than the distance between the posts 31. The section 49 is connected with the section 48 by hinges 51 and the hinge-straps 51$^a$ extend over the rest upon the section 50 and prevent the section 49 from turning downward. In order to remove the deck it is only necessary to turn the section 49 back upon the section 48 and then lift the connected sections and withdraw them through the space between the posts 1 and 3, and withdraw the section 50 through the space between the posts 31 and 32. In addition to serving as a part of the deck the section 50 is adapted to serve as a floor for the detachable crate section B when it is used as a separate coop as illustrated in Fig. 15. This double use of the floor section 50 is of obvious practical advantage.

Vertical partition gates serve to divide into compartments the space above the deck and the space below the deck. The inside gates are all alike so a description of one will suffice for all. Each inside gate comprises vertical slats 52 nailed on horizontal battens 53. The battens 53 of the upper gate extend across and rest upon the side slats 39 and 40 and the battens of the lower gate extend across and rest upon the slats 26. The outer slats 52 of the upper gate abut against the posts 31 and prevent lateral movement of the gate and the outer slats of the lower gate abut against the posts 3 and prevent lateral movement of the gate. The outer slats of the gates are notched as shown at 52$^a$, so that when the gate is used below the deck the upper ends of the gate slats will clear the inclined foot boards 25. Hooks 54 on the battens 53 hook into eyes 55 on the posts 3, 31 and 32 and connect the inside gates with the posts 3, 3, and 31, 31, or with the posts 31, 31, and 32, 32, as the case may be. The posts 32 are equipped with eyes 55 in order that the same inside gates may be used as end gates for the section B when said section is arranged for use as a separate coop as shown in Fig. 15.

Springy latch bars 56 are pivotally connected with the slats 40 and have at their lower end hooks 56$^a$ which engage in box loops 57 fixed on the slats 17 and serve to lock the crate section B in place on the section A. The latch bars 56 are pivotally connected with the side slats of the crate in order that they may be turned upward out of the way as shown in Fig. 15 when section B of the crate is used as a separate coop.

To prevent lateral displacement of the short posts 2 and 32 I provide corner braces 58, shown in detail in Fig. 13, comprising a relatively long member 58′, a shorter member 58″ at right angles to the member 58′ and an intermediate integral connection 58‴. The member 58′ has holes 58$^a$ to receive screws 59 connecting the brace with the posts and slats of the crate and the member 58″ has similar holes 58$^b$. It will be observed that the braces 58, owing to the peculiar construction described are adapted to fit on upper corners, lower corners, right-hand corners, or left-hand corners; and in every case the central connection 58‴ will contact with the edge of the slat with which the brace is connected so that the strain will always be crosswise of the width of the brace and comparatively light braces will be very rigid at the place where the greatest strength is required. The corner braces are interchangeable; it is therefore necessary to have only one pattern of corner brace for the entire crate.

When used for shipping hogs the section B will be secured on the section A; the lower floor will be in place in the main section; the deck and the partition gates will be removed; and when the animal is placed in the crate the front and rear gates will be put in place and secured.

When used for breeding purposes section B will be removed and the rod 29, which previously held the sections together, will be inserted through the proper holes 26ª to prevent backing of the sow. If the sow within the crate is too low the rear floor section 24 may be tilted and supported on a rail S resting on the slats 27, or equivalent supports as shown in Fig. 11 to raise her, or the entire section may be raised as shown in Fig. 12; if she is too high the sections 22, 23 and 24 may be removed so that she will stand lower upon the ground.

To use the crate for ringing, or marking hogs, or the like, section B will be secured in place on section A; all the gates and upper floor will be removed; and the hog-holding lever 21 will be placed on one of the bolts 20 properly located for the purpose. The hogs will then be driven into the crate in succession and each one will be caught by the neck as his head emerges through the front opening of the crate, and will be held by the lever locked by the pawl 21ᶜ engaging the teeth of the ratchet plate 9 while the operation is being performed; and so on for each of the hogs in succession.

In performing certain surgical operations the hog should lie upon its side. This is accomplished by catching the hog with the lever the same as in ringing, removing section B and then turning the crate upon its side. When the crate is on its side the rear floor section may be removed if necessary to afford free access to the animal.

In case section B is to be used as a separate chicken coop it will be detached from section A. The deck section 50 will be placed on the rails 33 to form the bottom of the coop and the partition gates will then be placed and secured, one at each end of the coop.

If the crate is to be used for shipping poultry the deck will be put in place, and the partition gates may or may not be put in place above or below the deck to divide the crate into four compartments each of which may contain one kind of fowl.

If large fowls such as turkeys and smaller fowls such as chickens, or ducks, are to be shipped together in the crate; the rear deck section 50 will be removed and the partition gates will be put in place and secured. There will then be two smaller compartments, one above and one below the deck, for housing the smaller fowls and another larger compartment the full height of the crate, for housing turkeys.

Crates of this class have heretofore been so constructed that if the detachable section is in place on the main section the end gates of the crate must be opened to give access to the interior of the crate. I overcome this defect by placing the door in the top of the detachable section, so that when the sections are connected and the deck is in place, the fowls above the deck may be reached through the top door without danger of escape of the fowls below the deck; and the rear end gate may be partially raised to give access to the compartment below the deck without danger of escape of the fowls from the compartment above the deck.

Having fully described my invention what I claim as new and desire to secure by Letters Patent is:

1. In a crate, the combination of a main section having lengthwise side slats and posts supporting said slats; a complemental section having lengthwise side slats in line with some of the side slats of the main section and posts supporting said side slats; a deck comprising a first section adapted to fit on the side slats of and between the posts of the main crate-section, a second deck section adapted to fit on the side slats of and between the posts of the complemental crate section; an intermediate deck section fitting between the posts of said main and complemental crate-sections; and hinges connecting said intermediate deck-section with one deck-section, and having members over-lapping the other deck-section.

2. In a crate, the combination of a main section having an inclosed part adapted to house an animal and an extension equipped with side slats having a series of holes; a supplemental section mounted on the extension of said main section; a gate, and a bolt adapted to connect together the main section and the supplemental section and gate, also adapted for insertion in the holes of said series of holes, to limit backward movement of the animal housed in the inclosed part of the main section.

3. In a crate, the combination of a main section having an extension, a floor extending the length of said main section, a supplemental section connectible with the main section and having a way adapted to accommodate a vertically movable gate, a gate fitting in the way of said extension and a single connecting device connecting said main section, supplemental section and gate.

4. In a crate, the combination of a main structure having foot boards lengthwise thereof, a deck extending lengthwise of said crate and partition gates usable indiscriminately above or below said deck.

5. In a crate, the combination of a main crate-section having an extension, a complemental crate-section connectible with said main crate-section, a sectional deck having a section adapted to serve as a floor for said complemental crate-section when it is detached, and gates adapted to fit within said main crate-section to form partitions when the crate-sections are connected or disconnected, and also adapted to serve as end gates for said detachable crate section when it is detached.

6. In a sectional hog and poultry crate, the combination of a main section having a body part provided with lengthwise side slats extending the full length of the section and an extension provided with lengthwise side slats shorter than the side slats of the body part of the main section; a complemental section connectible with the main section and having lengthwise side slats in line with and inter-locking end to end with the lengthwise side slats of the extension of the main section to prevent upward movement of the inner end of the detachable crate-section and to form continuous deck-supports extending the entire length of both sections and adapted to support at any one of a number of different levels a deck with a continuous flat surface extending the full length of the extension of the main section and the full length of the complemental section; means connecting the complemental section with the main section and a removable deck extending the full length of the crate and adapted to occupy a horizontal position on said continuous deck supports at any one of a number of different levels.

In witness whereof I have hereunto signed my name at Springfield, this 29th day of May, 1909.

GEORGE W. REED, Jr.

Witnesses:
EARL C. WILLEY,
W. J. AURELIUS.

---

Copies of this patent may be obtained for five cents each, by addressing the "Commissioner of Patents, Washington, D. C."